(12) United States Patent
Akhil

(10) Patent No.: US 11,954,880 B2
(45) Date of Patent: Apr. 9, 2024

(54) VIDEO PROCESSING

(71) Applicant: Nokia Technologies OY, Espoo (FI)

(72) Inventor: Mathur Akhil, Cambridge (GB)

(73) Assignee: NOKIA TECHNOLOGIES OY, Espoo (FI)

(*) Notice: Subject to any disclaimer, the term of this patent is extended or adjusted under 35 U.S.C. 154(b) by 337 days.

(21) Appl. No.: 16/857,657

(22) Filed: Apr. 24, 2020

(65) Prior Publication Data

US 2020/0364894 A1  Nov. 19, 2020

(30) Foreign Application Priority Data

May 14, 2019  (EP) .................................... 19174348

(51) Int. Cl.
*G06T 7/70* (2017.01)
*G06N 3/092* (2023.01)
*G06T 7/00* (2017.01)
*G06V 20/40* (2022.01)

(52) U.S. Cl.
CPC .................. *G06T 7/70* (2017.01); *G06T 7/97* (2017.01); *G06V 20/46* (2022.01); *G06T 2207/10016* (2013.01); *G06T 2207/20081* (2013.01)

(58) Field of Classification Search
CPC .... G06T 7/70; G06T 7/73; G06T 7/97; G06T 9/004; G06T 2207/10016; G06T 2207/10021; G06T 2207/20081; G06T 2207/20084; G06K 9/00744; G06K 9/00751; G06K 9/00765; G06V 20/46; G06V 20/58; G06V 20/41; G06F 18/214; G06N 3/045; G06N 3/08; G06N 3/092; H04N 7/0127; H04N 19/132

USPC ................................. 382/103–104, 232, 236
See application file for complete search history.

(56) References Cited

U.S. PATENT DOCUMENTS

| 7,095,786 | B1* | 8/2006 | Schonfeld | H04N 19/51 |
| | | | | 375/240.16 |
| 10,372,995 | B2* | 8/2019 | Zhang | G06K 9/00751 |
| 10,373,461 | B2* | 8/2019 | Li | G11B 27/031 |
| 2014/0205141 | A1* | 7/2014 | Gao | G06T 7/20 |
| | | | | 382/103 |

(Continued)

FOREIGN PATENT DOCUMENTS

CN  109409221 A  3/2019

OTHER PUBLICATIONS

FFNet: Video Fast-Forwarding via Reinforcement Learning, Shuyue Lan, Rameswar Panda, Qi Zhu, Amit K. Roy-Chowdhury; Proceedings of the IEEE Conference on Computer Vision and Pattern Recognition (CVPR), 2018, pp. 6771-6780 (Year: 2018).*

(Continued)

*Primary Examiner* — Sean M Conner
(74) *Attorney, Agent, or Firm* — Harness, Dickey & Pierce, P.L.C.

(57) ABSTRACT

The method includes receiving data representing a first frame of video content including a plurality of frames and determining, for at least one object in a first frame, an object type and position in the first frame. The method further includes determining a number of frames N to skip over based on the type and position of the object in the first frame and the type and position of one or more objects in one or more prior frames, and for providing the N+1 frame, and not the skipped-over frames.

16 Claims, 6 Drawing Sheets

(56) References Cited

U.S. PATENT DOCUMENTS

2014/0369555 A1* 12/2014 Zhong .................. G06K 9/3233
                                                            382/103
2015/0117703 A1*  4/2015 Peng .................. G06K 9/00718
                                                            382/103
2016/0267325 A1*  9/2016 Sundaresan ........ G06K 9/00624
2017/0192423 A1*  7/2017 Rust .................. G01C 21/3492
2019/0347806 A1* 11/2019 Vajapey .................. G06T 7/246
2020/0160060 A1*  5/2020 Lin .................. G11B 20/10527

OTHER PUBLICATIONS

G. Vaudaux-Ruth, A. Chan-Hon-Tong and C. Achard, "ActionSpotter: Deep Reinforcement Learning Framework for Temporal Action Spotting in Videos," 2020 25th International Conference on Pattern Recognition (ICPR), 2021, pp. 631-638, doi: 10.1109/ICPR48806.2021.9413153. (Year: 2021).*

European Office Action dated Jan. 4, 2022 issued in corresponding European Appln. No. 19174348.3.

* cited by examiner

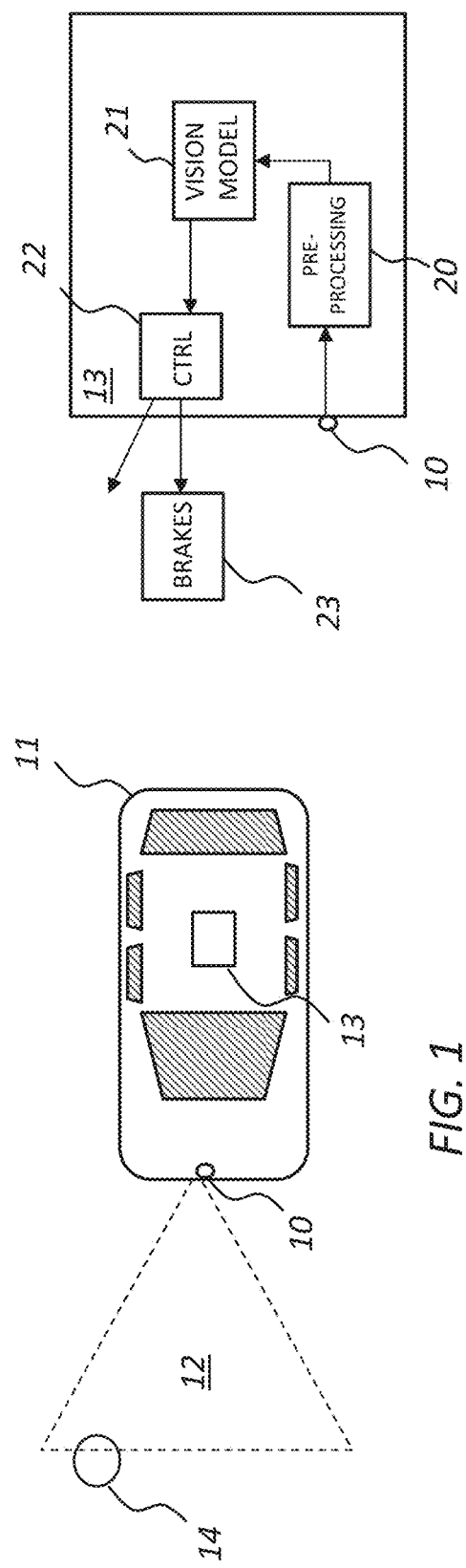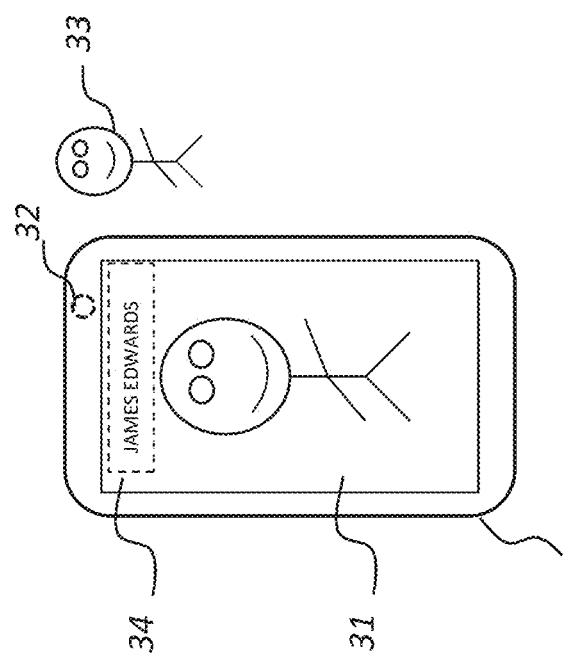

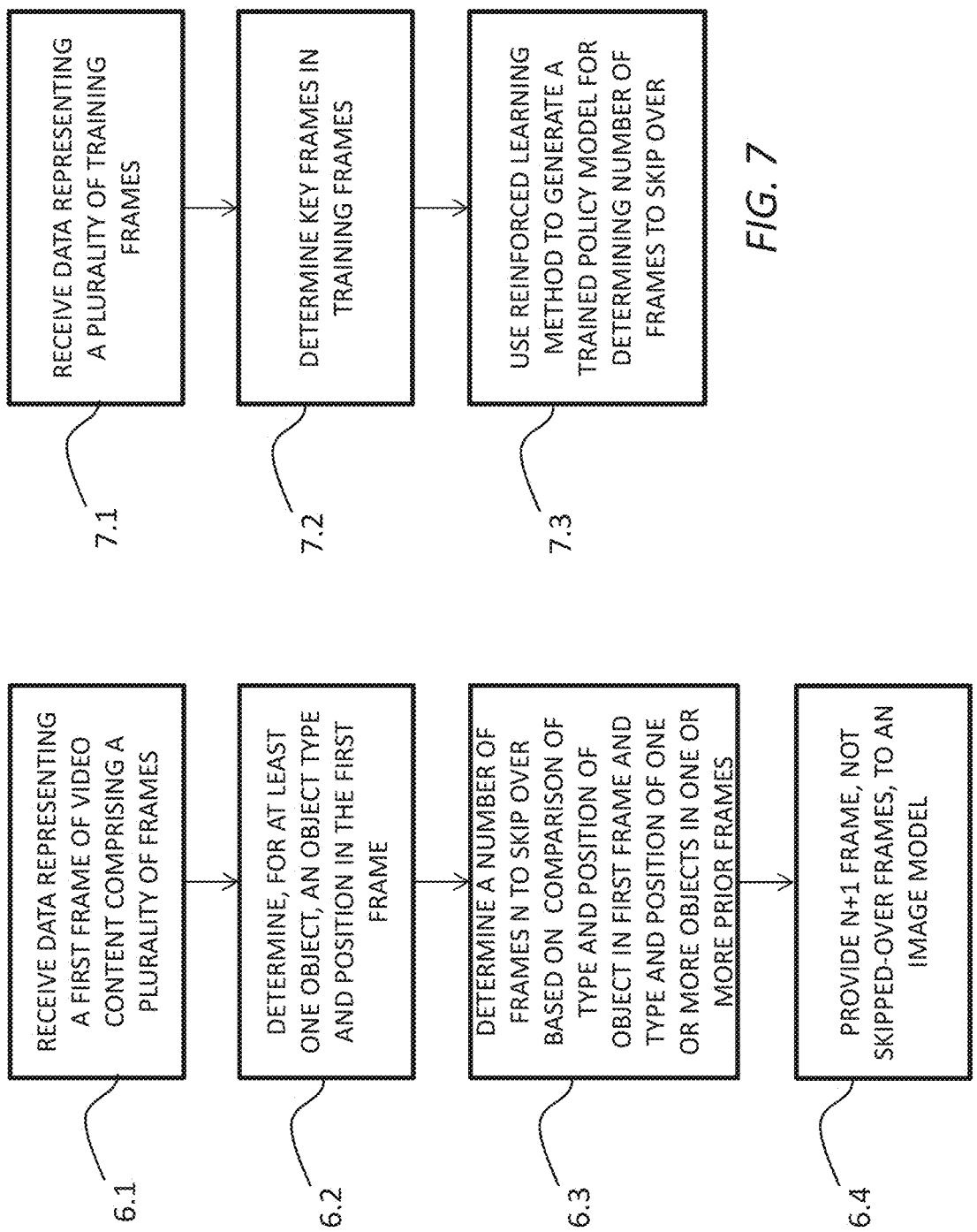

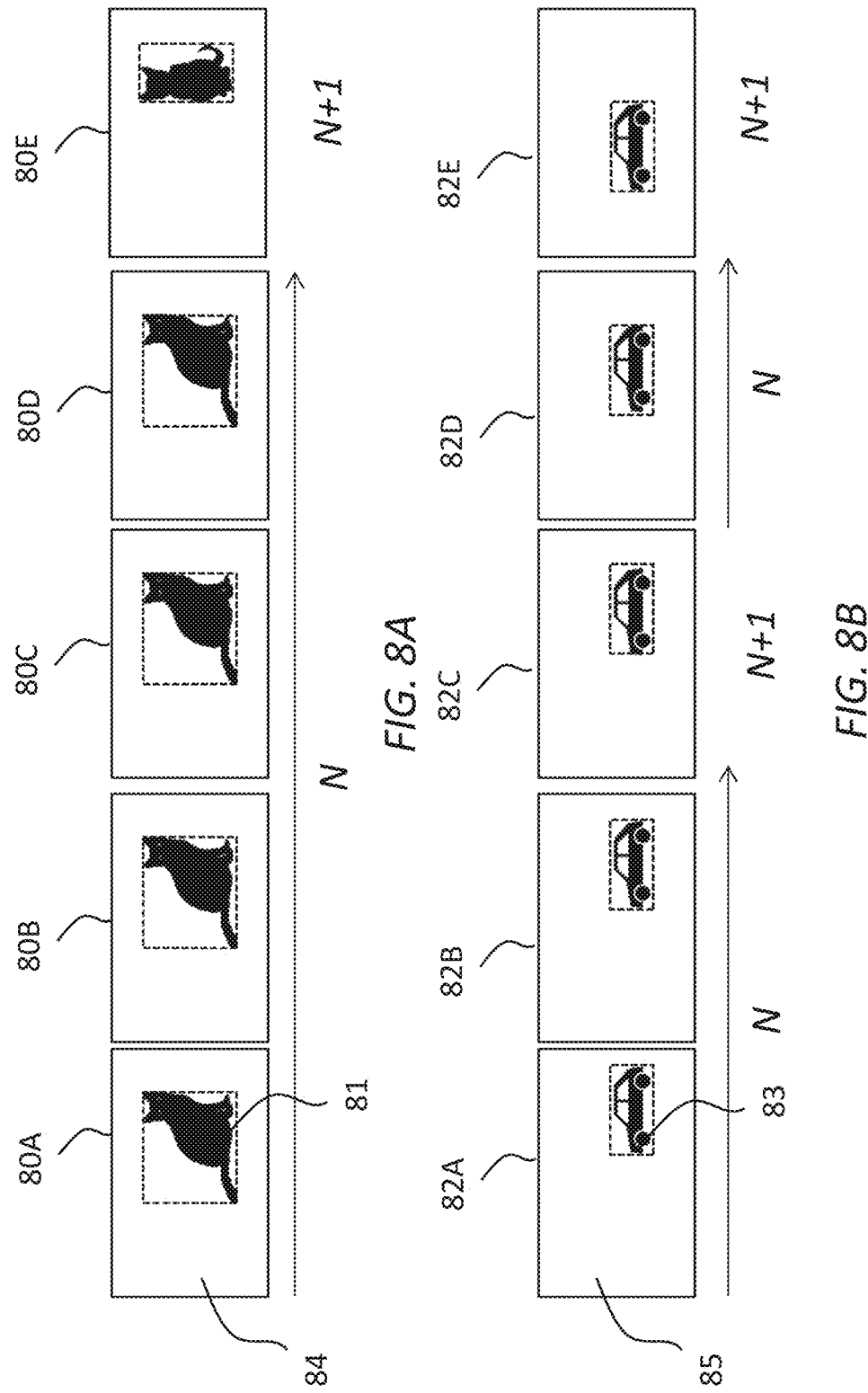

VIDEO PROCESSING

CROSS-REFERENCE TO RELATED APPLICATIONS

The present application claims priority under 35 U.S.C. § 119 to European Patent Application No. 19174348.3, filed on May 14, 2019, in the Korean Intellectual Property Office, the entire contents of which are hereby incorporated by reference.

FIELD

Example embodiments relate to video processing, for example processing of video frames for provision to a computational analysis model.

BACKGROUND

Machine or computer vision is an interesting and important aspect of many emerging applications. Computer vision may involve receiving video frames, possibly but not necessarily live video frames, and applying them to a computational analysis model which may, for example, identify specific objects or situations based on the received video, and may even make certain inferences and/or decisions based on analysis.

SUMMARY

The scope of protection sought for various embodiments of the invention is set out by the independent claims.

The embodiments and features, if any, described in this specification that do not fall under the scope of the independent claims are to be interpreted as examples useful for understanding various embodiments of the invention.

According to one aspect, there is provided an apparatus, comprising means for: receiving data representing a first frame of video content comprising a plurality of frames; determining, for at least one object in a first frame, an object type and position in the first frame; determining a number of frames N to skip over based on a comparison of the type and position of the object in the first frame with the type and position of one or more objects in one or more prior frames; and providing the N+1 frame, and not the skipped-over frames, to means for applying said frame to an image model.

Determining the object type and position in the first frame may comprise identifying a plurality of objects in the first frame, determining for each object the object type and position in the first frame, and wherein determining the number of frames N to skip over is based on a comparison of the respective types and positions of all objects in the first frame with the types and positions of one or more objects in one or more prior frames.

The means may be further configured to receive subsequent frame of video content of the plurality of frames and repeat the determining and providing operations for said subsequent frames.

The means may be configured to determine the number of frames N to skip over using a policy model which receives as input a state parameter S indicative of the respective type and position of the one or more objects in the first, or any subsequent frame.

The policy model may be a pre-trained policy model.

The policy model may be pre-trained using a reinforced learning method.

The policy model may be trained by means of using a reinforced learning method which takes as input a plurality of training images and an object detection model for determining key frames in the plurality of training images, wherein the reinforced learning method uses a reward function that rewards, for given states, an increase in the number of frames N skipped over, whilst penalizing the skipping over of determined key frames.

The object detection model may determine key frames as frames in which new objects appear or object transitions occur.

The image model processing means may be remote from the apparatus.

The image model processing means may be a computational model for analysing provided frames and for producing inference output.

The means as defined herein may comprise at least one processor; and at least one memory connected to the at least one processor.

According to another aspect, there may be provided a method, comprising: receiving data representing a first frame of video content comprising a plurality of frames; determining, for at least one object in a first frame, an object type and position in the first frame; determining a number of frames N to skip over based on a comparison of the type and position of the object in the first frame with the type and position of one or more objects in one or more prior frames; and providing the N+1 frame, and not the skipped-over frames, to a vision model processor.

According to another aspect, there may be provided a non-transitory computer readable medium comprising program instructions stored thereon for performing a method, comprising: receiving data representing a first frame of video content comprising a plurality of frames; determining, for at least one object in a first frame, an object type and position in the first frame; determining a number of frames N to skip over based on a comparison of the type and position of the object in the first frame with the type and position of one or more objects in one or more prior frames; and providing the N+1 frame, and not the skipped-over frames, to a vision model processor.

According to another aspect, there may be provided an apparatus comprising means for: receiving data representing a plurality of training images representing one or more segments of video; determining key frames in the plurality of training images; using a reinforced learning method to generate a trained policy model for determining a number N of frames to skip over responsive to a detected state S, the reinforced learning method taking as input the plurality of training images and using a reward function to reward, for given states, an increase in the number of frames skipped over whilst penalizing the skipping over of determined key frames to arrive at the trained policy model.

According to another aspect, there may be provided a method, comprising: receiving data representing a plurality of training images representing one or more segments of video; determining key frames in the plurality of training images; using a reinforced learning method to generate a trained policy model for determining a number N of frames to skip over responsive to a detected state S, the reinforced learning method taking as input the plurality of training images and using a reward function to reward, for given states, an increase in the number of frames skipped over whilst penalizing the skipping over of determined key frames to arrive at the trained policy model.

According to another aspect, there may be provided an apparatus comprising at least one processor, at least one memory directly connected to the at least one processor, the at least one memory including computer program code, and the at least one processor, with the at least one memory and the computer program code being arranged to perform a method comprising receiving data representing a first frame of video content comprising a plurality of frames; determining, for at least one object in a first frame, an object type and position in the first frame; determining a number of frames N to skip over based on a comparison of the type and position of the object in the first frame with the type and position of one or more objects in one or more prior frames; and providing the N+1 frame, and not the skipped-over frames, to a vision model processor.

According to another aspect, there may be provided an apparatus comprising at least one processor, at least one memory directly connected to the at least one processor, the at least one memory including computer program code, and the at least one processor, with the at least one memory and the computer program code being arranged to perform a method comprising receiving data representing a plurality of training images representing one or more segments of video; determining key frames in the plurality of training images; using a reinforced learning method to generate a trained policy model for determining a number N of frames to skip over responsive to a detected state S, the reinforced learning method taking as input the plurality of training images and using a reward function to reward, for given states, an increase in the number of frames skipped over whilst penalizing the skipping over of determined key frames to arrive at the trained policy model.

According to another aspect, there may be provided a non-transitory computer readable medium comprising program instructions stored thereon for performing a method, comprising: receiving data representing a first frame of video content comprising a plurality of frames; determining, for at least one object in a first frame, an object type and position in the first frame; determining a number of frames N to skip over based on a comparison of the type and position of the object in the first frame with the type and position of one or more objects in one or more prior frames; and providing the N+1 frame, and not the skipped-over frames, to a vision model processor.

According to another aspect, there may be provided a non-transitory computer readable medium comprising program instructions stored thereon for performing a method, comprising: receiving data representing a plurality of training images representing one or more segments of video; determining key frames in the plurality of training images; using a reinforced learning method to generate a trained policy model for determining a number N of frames to skip over responsive to a detected state S, the reinforced learning method taking as input the plurality of training images and using a reward function to reward, for given states, an increase in the number of frames skipped over whilst penalizing the skipping over of determined key frames to arrive at the trained policy model.

According to another aspect, there may be provided an apparatus comprising: at least one processor; and at least one memory including computer program code which, when executed by the at least one processor, causes the apparatus: to receive data representing a first frame of video content comprising a plurality of frames; to determine, for at least one object in a first frame, an object type and position in the first frame; to determine a number of frames N to skip over based on a comparison of the type and position of the object in the first frame with the type and position of one or more objects in one or more prior frames; and to provide the N+1 frame, and not the skipped-over frames, to a vision model processor.

According to another aspect, there may be provided an apparatus comprising: at least one processor; and at least one memory including computer program code which, when executed by the at least one processor, causes the apparatus: to receive data representing a plurality of training images representing one or more segments of video; to determine key frames in the plurality of training images; using a reinforced learning method to generate a trained policy model for determining a number N of frames to skip over responsive to a detected state S, the reinforced learning method taking as input the plurality of training images and to use a reward function to reward, for given states, an increase in the number of frames skipped over whilst penalizing the skipping over of determined key frames to arrive at the trained policy model.

BRIEF DESCRIPTION OF THE DRAWINGS

Example embodiments will now be described, by way of non-limiting example, with reference to the accompanying drawings, in which:

FIG. 1 is a top plan view of an object employing one or more image capture devices and memory management units which may be configured in accordance with some example embodiments;

FIG. 2 is a schematic view of a memory management unit shown in FIG. 1;

FIG. 3 is a front view of a mobile terminal employing one or more image capture devices and which may be configured in accordance with some example embodiments;

FIG. 6 is a flow diagram illustrating in more general terms processing operations that may comprise example embodiments;

FIG. 7 is a flow diagram illustrating processing operations that may comprise example embodiments relating to training a policy model;

FIGS. 8A and 8B are, respectively, frame sequences of video content, each showing an identified object, which may be useful for understanding example embodiments;

DETAILED DESCRIPTION

Figure 4:
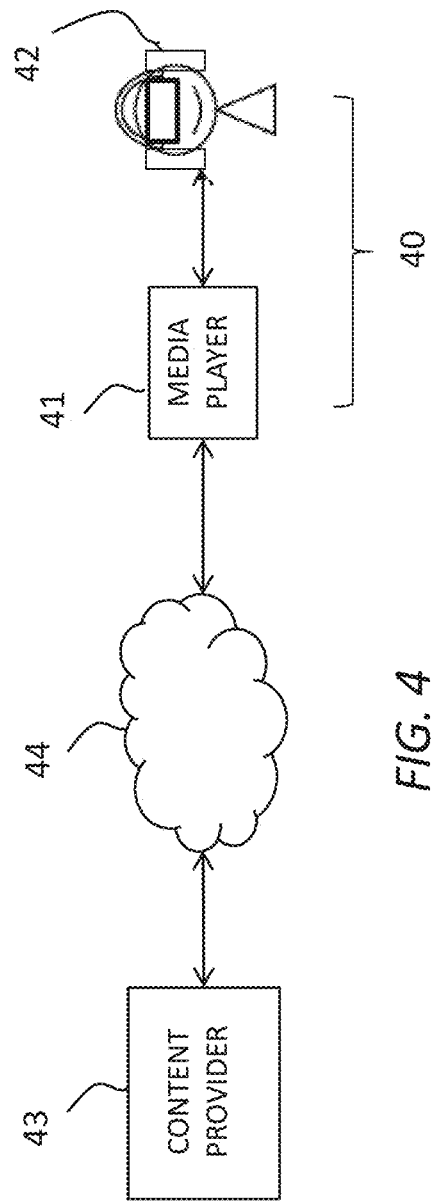
FIG. 4 is a block diagram of a virtual reality system, which may be configured in accordance with some example embodiments.

Example embodiments relate to video processing, which may involve receiving data, hereafter "video data," representing a plurality of frames which may comprise one or more video segments or video programmes. The video data may be received directly from a capture source, such as from one or more cameras, or may be received from some form of provisioning system such as a media server. The video data may be received as a streaming service or in one or more downloaded batches. The video data may represent a live video feed; that is data received from a capture source in real-time or near real-time, although this is not necessarily the case.

Example embodiments may relate to processing the video data prior to it being transferred to some other video processing system or module, such as one providing or implementing a computational analysis model that receives the video data and performs some analysis to generate inference output and/or which makes a decision which may be applied to some electronic, computerised or other technical system. For example, the analysis may involve one or more of identifying one or more objects in the video, determining specifically what they are in 'real-world' terms, tracking their movement, predicting future movement, detecting particular circumstances or events, e.g. a hazardous or suspicious events, and/or taking some form of action.

Referring to FIG. 1, for example, in the field of autonomous vehicles, one or more cameras 10 may be mounted on the body of a vehicle 11, each capturing a respective viewport 12 and feeding the generated video data representing, for example, sixty frames-per-second of captured video, to one or more management units 13. The one or more management units 13 may be one or more computerised systems that analyse the received video data to take actions based on a computerised model which may be stored locally, or possibly remotely, in data form. For example, the actions may comprise moving the vehicle forwards or backwards and at a particular speed, applying the brakes, deciding how urgently to apply the brakes, which direction to turn the wheels, and so forth. The management unit 13 may receive other data, such as positional data from an on-board GNSS receiver, traffic data from a remote system, mapping data and so forth. The computerised model, in basic terms, may determine what happens in real-time or near real-time as a result of detecting a particular situation contained in the video data. A situation may comprise one or more sub-states, such as detection of an object 14 at a given position, relative to the current speed and movement vector of the vehicle, the speed and movement vector of the object and the type of object. All of these sub-states may be used by the computerised model to determine, for example, whether to urgently apply the brakes, e.g. if the object 14 is a person and collision is likely to result, whether to change the speed and/or direction of the vehicle, if this will help avoid collision, or whether to do nothing, e.g. if the object is an item of litter.

FIG. 2 is a schematic view of the management unit 13 according to an example embodiment. The management unit 13 may comprise a pre-processing module 20 for receiving the video data from the one or more cameras 10. The purpose of the pre-processing module 20 will be explained later-on, but in overview is configured to select or filter which video frames are to be provided to a vision computational analysis model 21 (hereafter vision model) which performs more processing-intensive tasks involved in analysing the provided video frames. The vision model 21 may generate inference and/or decision output which may be displayed, e.g. to a driver or passenger information system, and/or which may be input to a control unit 22 which controls, in this case, one or more electrical and/or mechanical aspects of the vehicle 11. For example, the control unit 22 may issue a signal which controls application of the brakes 23. The same control unit 22, or other control units, may control other aspects such as steering, acceleration, indicating, lighting and so on.

Another example is illustrated in FIG. 3 which relates to an augmented reality (AR) application. A mobile device 30, such as a smartphone or tablet computer, may comprise a display screen 31 and one or more cameras 32 for capturing video data representing frames of video. Note that capturing may not mean storing the video on a memory of the mobile device, but may mean displaying it to the display screen 31. As a user of the mobile device 30 captures within the camera's viewport one or more objects 33, the video data may be analysed, for example, to identify objects such as people, barcodes, retail items, buildings, etc. which may be for a specific purpose. For example, a vision model may be used to analyse detected people, perform facial recognition and to display the name 34 of the person on the display screen 31.

AR is one of a number of technologies falling within the umbrella term of virtual reality (VR.) Any VR related technology may employ methods and apparatuses disclosed herein. For example, FIG. 4 shows a generalised VR system 40, comprising a media player 41 and a VR display device 42. The media player 41 may comprise a personal computer, laptop or games console. In some cases, the media player 41 may comprise part of the VR display device 42. The VR display device 42 may comprise a headset, glasses, goggles or a mobile phone. A remote content provider 43 may store and transmit streaming video data which, in the context of embodiments, is VR content data for display to the VR display device 42. The content provider 43 streams the VR content data over a data network 44, which may be any network, for example an IP network such as an over-the-air network, such as a 3G, 4G or 5G mobile IP network, a multicast network, or a broadcast network. If data network 44 is unidirectional, a return channel for providing feedback from VR display device 42 to the content provider 43 may be provided by another data network. The VR display device 42 may comprise two display screens and possibly speakers or headphones for outputting corresponding audio data. The VR display device 42 may also comprise one or more cameras for capturing the surrounding space of the user. Video data captured by the one or more cameras may be analysed in real-time by a vision model, for example to alert the user as to surrounding objects of a particular type and to pause said VR content data and/or to show a picture-in-picture view of the surrounding objects.

In all examples, the vision model used for analysis of the video frames may be stored locally in the user device, whether in the vehicle 11, mobile device 30 or VR system 40, or in some cases may be provided on an edge device, such as at a router or network, or even on a remote server, such as in a cloud-based system. The vision model may be generated based on one or more deep learning methods.

Such vision models may be computationally expensive to execute given the potential complexity or the models produced using deep learning. Vision models may be highly computationally expensive for real-time or near real-time applications, not least because the video data may be received at, for example, sixty frames per second. Some known vision models perform at approximately five Tera Operations per Second (TOPS) which gives an idea of the magnitude of processing involved in executing a computational model with incoming video frames. It follows that this involves significant energy consumption. An example real-time object detection vision model is called YOLO (You Only Look Once) which processes images at thirty frames per second.

Example embodiments herein may reduce the energy consumption by reducing the number of frames that are provided to the vision model analysis stage, which may employ a deep learning computational model. This enables lower energy consumption without needing to, for example, compress the vision model which may lead to degradation in performance and accuracy which may be critical to certain real-time applications such as in autonomous vehicles. Where the vision model is remote from the relevant apparatus, e.g. in the cloud, example embodiments also reduce the number of frames that need to be transmitted over the relevant network. Example embodiments may therefore offer bandwidth savings.

Example embodiments involve receiving a frame of the video data, identifying one or more objects therein, and determining a number of frames N to skip over based on the type and position of the one or more objects in the frame compared with the type and position of one or more objects in one or more prior frames. The skipped-over frames are not provided to the vision model for image analysis. Rather, the subsequent frame N+1 is that which is next provided, and the process may repeat for further received frames, whereby the number of frames N to skip over may dynamically change depending on said type and spatio-temporal locality observations.

A policy model may be used to determine the number of frames N to skip over. The policy model may be a pre-trained policy model that is provided as a stand-alone data set or structure on the relevant device, whether a mobile device or vehicle, or whichever other form of device is involved. The policy model may be pre-trained using a reinforced learning (RL) method, such as by using a Markov Decision Process (MDP) to produce a Q-network. The policy model may receive as input a state parameter S indicative of the spatio-temporal locality of the one or more objects in the current frame in relation to one or more prior frames.

A type of object may refer to a class of object, for example to differentiate humans from animals, and both humans and animals from vehicles, and so on. Different sub-classes may even be classified within each class, e.g. within a human class there may be gender sub-classes (male and female), short and tall human sub-classes etc. Similarly, sub-classes may be provided for aminals (e.g. cheetah, cat) and vehicles (e.g. car, ship, aircraft.) An object's type may be produced as an inference from an object recognition model which has been pre-trained to classify received image data as comprising one or more identified object types and/or sub-types.

Spatio-temporal locality refers to how much an identified object changes its spatial position over time. The object may comprise a blob of spatially adjacent pixels in a given frame (segmentation) or may be determined by identifying regions of interest, e.g. in rectangular bounding boxes as compared with non-objects such as background terrain. This may give some indication of what the object is, e.g. a slow or fast moving object, which in some example embodiments may be used to determine what action, e.g. how many frames to skip, is performed. In some embodiments, by computationally determining the type of object that is identified, e.g. what class and/or sub-class it belongs to using a trained computational model, the temporal locality of said object type across a plurality of frames may provide additional information that provides a better estimate of the number of frames N to skip over. So, for example, an object identified as a first type may be treated differently from an object identified as a second type by a policy model. The first type may for example be a car and the second type may be a boat. In some embodiments, multiple objects in the received frame are assessed using the policy model.

In some embodiments, all pixels or objects in the received frame are assessed using the policy model, whereby some pixels or objects may represent one or more specific objects of interest and other pixels may represent non-objects, e.g. background. Therefore, an assessment may be made on a whole-frame basis whereby the policy model determines the number of frames to skip over based not on only one object, but rather all objects in the frame.

It follows that by reducing the number of frames that are provided to a subsequent, processing-heavy stage of video analysis, energy consumption may be reduced. This is enabled by means of a data-driven (as opposed to, e.g. heuristic) approach in which the accuracy of inferences or decisions made by the subsequent video analysis stage should be maintained, or at least not reduced significantly.

Figure 5:
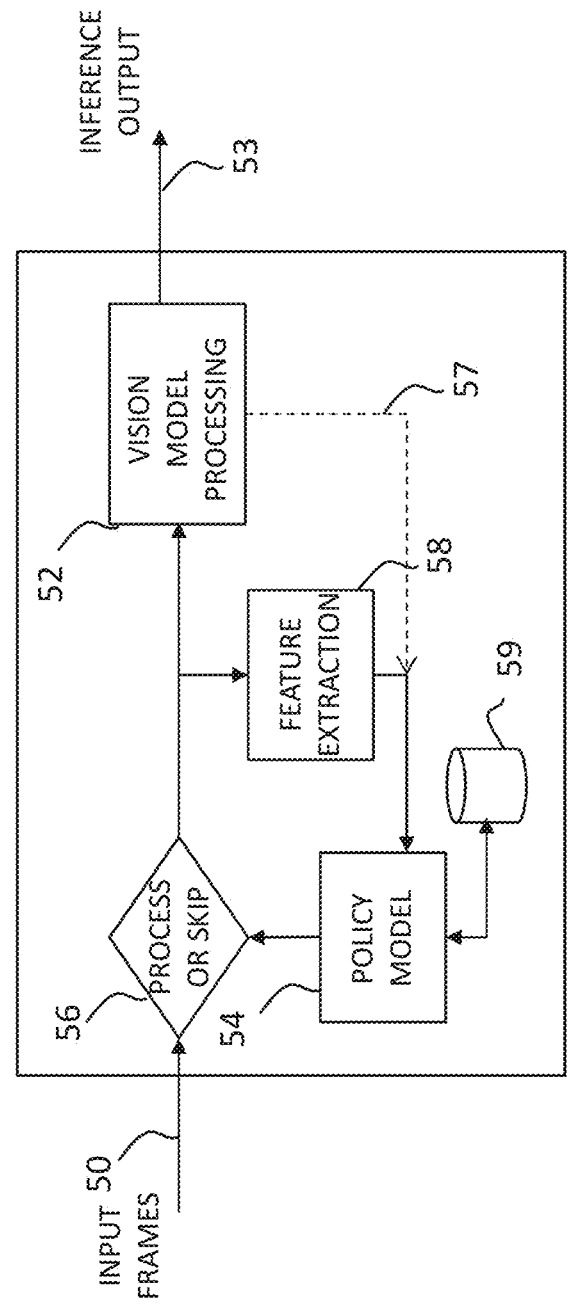
FIG. 5 is a flow diagram illustrating processing operations that may comprise example embodiments.

FIG. 5 is a flow diagram of operations performed on an apparatus on which example embodiments are provided or performed. For example, the apparatus may be any of the systems shown in FIGS. 1-4. The apparatus receives input video frames 50, which may be received in real-time or near real-time in order for a vision model 52 to produce inference output 53 based on a process or skip controller 56 which determines which frames are passed for processing by said vision model 52 and which are skipped over. The process or skip controller 56 decisions are made based on a policy model 54 which informs the former how many frames N to skip over. The skipped-over frames N may still nevertheless be output, e.g. to a display screen, but are not passed to the vision model 52 for analysis processing. A feature extraction stage 58 may be provided to extract and determine object types, to identify their co-ordinates in accordance with known methods, and to provide this information as input to the policy model 54. The feature extraction stage 58 may comprise a pre-trained model for determining object type, which may comprise one or more layers of sub-types. Example pre-trained models may comprise one or more of YOLO, TinyYOLO and convolutional neural network (CNN) based feature extractors.

Alternatively, or additionally, as indicated by the dashed line 57, the vision model 52 may be used, at least in part, to determine object type and/or sub-type and provide inference output to the policy model 54. It may be assumed that the vision model 52 is configured to perform some further vision processing task in addition to determining object type. The policy model 54 may compare the respective object types and co-ordinates with types and co-ordinates (and possibly other parameters) of corresponding objects in one or more previous frames. The policy model 54 may access a data store 59 or cache which maintains a buffer of predefined or variable length representing objects and co-ordinates in previous frames. The policy model 54 generates the next value of N and the process may repeat.

FIG. 6 is a flow diagram of operations in more general form, which operations may be performed by hardware, software or a combination of both.

A first operation 6.1 may comprise receiving data representing a first frame of video content comprising a plurality of frames.

A second operation 6.1 may comprise determining, for at least one object in a first frame, an object type and position in the first frame.

A third operation 6.2 may comprise determining a number of frames N to skip over based on a comparison of the type and position of the object in the first frame with the type and position of one or more objects in one or more prior frames.

A fourth operation 6.3 may comprise providing the N+1$^{th}$ frame, not the skipped-over frames, to a vision model for processing the frame and providing, e.g. an inference output.

The above-mentioned policy model 54 may be pre-trained and provided as a stand-alone model for storage on the relevant apparatus. It may be pre-trained by an external system and deployed or distributed over a network.

Regarding the training stage, this may involve training a reinforced learning (RL) model using unlabelled video segments; that is a potentially large number of video frames from disparate sources which have not be categorised or labelled in any particular way for use in a machine learning method. Such unlabelled video is freely available from various providers and/or can be obtained from the internet. The policy model 54 may be trained using a Markov Decision Process (MDP) where there are a number of elements, namely a state, actions and rewards. In other embodiments, the training frames may be labelled.

For example, a state S may be defined as the current state of the video frame $F_n$ which may comprise an object having an inferred type and/or sub-type and having pixels at certain co-ordinates and some historical information about the object, e.g. co-ordinates in one or more prior frames.

For example, an action A may provide an update of the state S. Actions A may correspond to the number of frames N that should be skipped over. Therefore, knowledge of both the input (co-ordinates in the frame) and output (what the type and spatio-temporal locality information indicates about the one or more objects) in a given state S may result in an action A to update the state, e.g. skip N frames. For example, a stationary or slow-moving object type, such as a resting cat, may result in a greater number of frames being skipped than a faster-moving object type, such as a moving car. Thus, the semantics of the object type are taken into account during training to provide additional information useful for generating an appropriate action A. Taking the above example, without knowledge of the object type of 'cat' or 'car,' if both object bounding boxes are at the same position ($x_1$, $y_1$, $z_1$) then their states S are the same. Incorporating the object type differentiates the two objects as having respective different states, for example:

State $S_A=(x_1,y_1,z_1)+$(cat)

State $S_B=(x_1,y_1,z_1)+$(car).

The respective states $S_A$, $S_B$ may be assigned, through the training phase, a more accurate and fine-grained skipping policy appropriate for their semantics.

For example, a reward R may, for each action A performed in a state S, be assigned to an agent. The reward may depend on the input state S, the action A and an output state S' reached after performing the action A. The reward R may be designed during the training stage to increase or maximise the number of frames skipped over (i.e. N should be large.) As such, a greater reward R may be given to the agent if more frames N are skipped over. This is with the aim of reducing the number of frames needing to be processed by the subsequent video analysis stage using the vision model. However, in order to avoid missing any important objects or events in the video analysis stage, e.g. by skipping over important frames, training may also penalise the reward R if any so-called key frames are missed as a result of the skip over. Therefore, in some embodiments, key frames may be determined by applying the training frames to a pre-trained object detection model to identify frames in which either a new object appears or an existing object transitions. For example, during training, the reward R may increase by a value of x for every frame skipped over, but decreased by a value of y for every key frame skipped over. The values of x and y may be the same or different.

An optimal policy model may therefore be one that maximises the reward over an entire video segment whilst avoiding missing key frames.

After sufficient training, e.g. after a large but feasible number of training frames have been processed, the RL model is saved and may be deployed as the policy model to such apparatuses as are shown and described with reference to FIGS. 1-4, given byway of example. Thus, whilst generating the RL model might itself be computationally intensive, it need only be performed once before being deployed to other apparatuses for implementation.

FIG. 7 is a flow diagram of training operations in more general form, which operations may be performed by hardware, software or a combination of both.

A first operation 7.1 may comprise receiving data representing a plurality of training frames. The training frames may be unlabelled video frames.

A second operation 7.2 may comprise determining key frames in the training images. The key frames may be frames where a new object is detected or an object transitions. The key frames may be detected using a pre-trained object detection model.

A third operation 7.3 may comprise using a reinforced learning (RL) method to generate a trained policy model for determining a number of frames N to skip over based on a current state S. The state S may take into account the type and/or sub-type of object.

FIGS. 8A and 8B each show a plurality of sequential frames of respective video segments, by way of example, to show how the frames may be processed using the pre-trained policy model 54.

FIG. 8A shows sequential frames 80A-80E which depict a relatively static or slow-moving foreground object 81. Upon receiving the first frame 80A, the method may identify the foreground object 81 and background object 84 and extract features, such as the co-ordinates of the pixels blob which makes up the foreground object and that which makes up the background object. Other pixels corresponding to other objects (not shown) may also be taken into account. In other embodiments, feature extraction may involve identifying candidate objects within bounding boxes. The blobs/candidate objects may be passed to a computational model, for example within the feature extraction stage 58 or as part of the vision model 52, to determine object type and/or sub-type, e.g. "cat." The type and co-ordinates may be compared by the policy model 54 with type and co-ordinates of one or more previous frames (not shown) to identify that the foreground object 81 is a cat and has not moved or has moved very little. Accordingly, the policy model 54 may determine that this and the next three frames (N=4) may be skipped over with the subsequent frame 80E, being the $N+1^{th}$ frame, provided to the vision model 52.

FIG. 8B shows sequential frames 82A-82E which depict a relatively fast-moving foreground object 83, such as a moving vehicle. Upon receiving the first frame 82A the method may identify the foreground object 83 and background object 85 and extract features, such as the co-ordinates of the pixel blob which makes up the foreground object. In other embodiments, feature extraction may involve identifying candidate objects within bounding boxes. The blobs/candidate objects may be passed to a computational model, for example within the feature extraction stage 58 or as part of the vision model 52, to determine object type and/or sub-type, e.g. "car." The type and co-ordinates may be compared by the policy model 54 with type and co-ordinates of one or more previous frames (not shown) to identify that the foreground object 83 is a car and has moved by a relatively large amount. Accordingly, the policy model 54 may determine that this and the next frame (N=2) are to be skipped over with the subsequent frame 82C, being the N+1$^{th}$ frame, provided to the vision model 52. The process may repeat for the next frame 82D which, based on the spatio-temporal locality of this frame with regard to one or more previous frames, e.g. 82A-82C, may result in a different number of skip over frames, e.g. N=1.

In some examples therefore, substantially the entire frame is segmented into a plurality of objects, or multiple objects extracted, which is then processed by the policy model 54. In this way, one consolidated frame skipping decision is made based on the whole frame (rather than sub-regions) or all objects in a frame in order to skip the subsequent processing of one or more entire frames.

Figure 9:
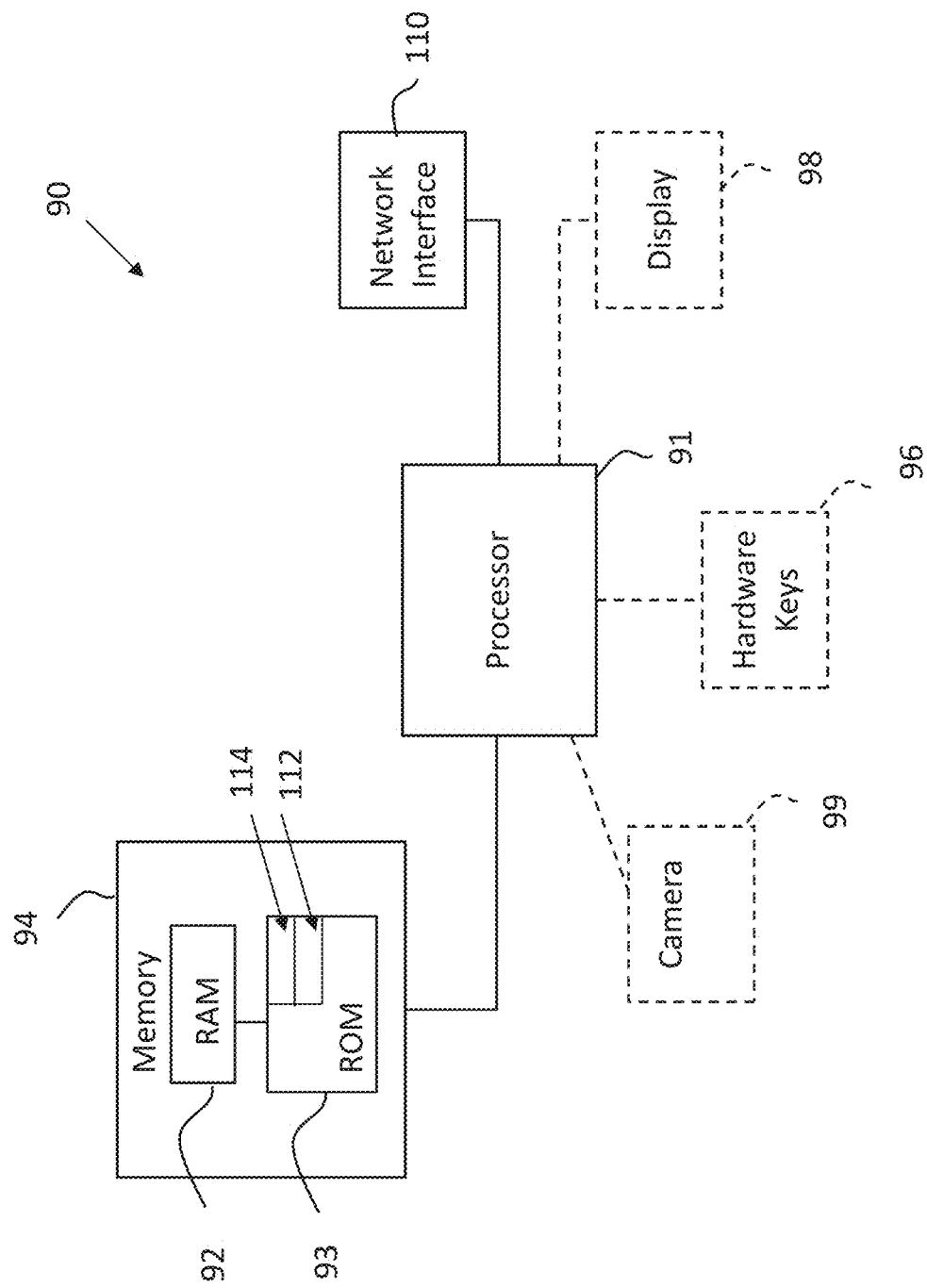
FIG. 9 is a schematic view of components that may comprise example embodiments.

FIG. 9 is a schematic diagram of components of an apparatus 90 in which the operations of either of FIGS. 6 and 7 may be performed. The apparatus 90 may have a controller 91, closely-coupled to a memory 94, and, optionally, hardware keys 96, a display 98 and a camera 99. The apparatus 90 may comprise at least one network interface 110 for connection to a network or other data networks, e.g. a modem which may be wired or wireless. For example, the network interface 110 may be used to download the policy model 54 and or the vision model 52 from a remote server or to provide a filtered-down number of frames to the vision model, if remote from the apparatus 90.

The memory 94 may be comprised of a RAM 92 and a ROM 93.

The processor 91 may be connected to each of the other components in order to control operation thereof.

The memory 94 may comprise a non-volatile memory, a hard disk drive (HDD) or a solid state drive (SSD). The ROM 93 of the memory 94 may store, amongst other things, an operating system 112 and may store one or more software applications 114. The RAM 92 of the memory 94 may be used by the processor 91 for the temporary storage of data. The operating system 112 may contain code which, when executed by the processor, performs the operations of either of FIGS. 6 and 7 and variants thereof.

The processor 91 may take any suitable form. For instance, it may be a microcontroller, plural microcontrollers, a processor, or plural processors.

The policy model 54 and/or the vision model may be stored in the ROM 93 or a separate storage module, for example on a memory card.

Figure 10:
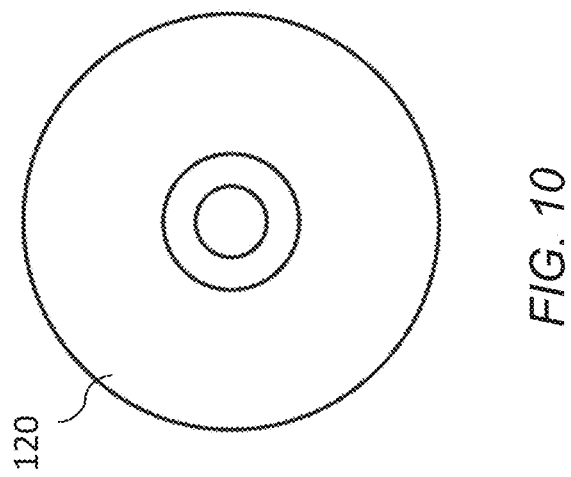
FIG. 10 is a plan view of a non-transitory medium that may store computer code which, when executed on one or more processors, may cause performance of processing operations described herein.

FIG. 10 shows a non-transitory media 120 according to some embodiments. The non-transitory media 120 is a computer readable storage medium. It may be e.g. a CD, a DVD, a USB stick, a blue ray disk, etc. The non-transitory media 120 stores computer program code, causing an apparatus to perform the method of any of FIGS. 6 and/or 7, when executed by a processor such as processor 91 of FIG. 9.

In the foregoing, names of network elements, protocols, and methods may be based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a sram, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

References to "means" may mean any hardware or software or combination thereof. For example, means may refer to at least one processor; and at least one memory connected to the at least one processor.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
   a memory configured to store executable code;
   at least one processor configured to execute the executable code to cause the apparatus to,
   receive data representing a first frame of video content, the video content comprising a plurality of frames;
   determine, for at least one object the first frame, an object type and position in the first frame;
   using a policy model, determine a number of frames N of the plurality of frames to skip over based on the type and position of the at least one object in the first frame and the type and position of the at least one objects in one or more prior frames of the video content, wherein the policy model has been trained using a reinforced learning method which uses a reward function that rewards, for given states indicative of the type and position of the one or more objects in the frame, an increase in the number of frames N skipped over, while penalizing the skipping over of determined key frames, wherein the key frames are frames in which new objects appear or object transitions occur; and
   provide the N+1 frame of the plurality of frames, and not the skipped-over frames, to a vision model processor configured to analyse the provided N+1 frame.

2. The apparatus of claim 1, wherein the at least one object is a plurality of objects, and the determining the object type and position in the first frame further comprises:
   identifying the plurality of objects in the first frame;
   determining, for each object of the plurality of objects, the object type and position in the first frame; and wherein
   the determining the number of frames N to skip over is based on the respective types and positions of the plurality of objects in the first frame and the types and positions of the plurality of objects in the one or more prior frames.

3. The apparatus of claim 1, wherein the at least one processor is configured to further cause the apparatus to:

receive a subsequent frame of the plurality of frames and repeat the operations of claim 1 for the subsequent frames.

4. The apparatus of claim 1, wherein
the policy model is configured to receive as input a state parameter indicative of the respective type and position of the at least one object in the first, or any subsequent frame.

5. The apparatus of claim 4, wherein
the reinforced learning method used to train the policy model is configured to takes as input a plurality of training images and an object detection model for determining key frames in the plurality of training images.

6. The apparatus of claim 5, wherein the object detection model has been pre-trained to classify received image data as comprising one or more identified object classes.

7. The apparatus of claim 1, wherein the providing further includes providing the N+1 frame to a device remote from the apparatus.

8. The apparatus of claim 1, wherein the providing further includes providing the N+1 frame to a device executing the vision model, the vision model further configured to analyze the provided N+1 frame, and produce an inference output.

9. The apparatus of claim 1, wherein the at least one processor is further configured to execute the executable code to cause the apparatus to:
control a vehicle based on the analysis of the provided N+1 frame.

10. The apparatus of claim 9, wherein the controlling the vehicle further includes at least one of:
controlling steering of the vehicle, controlling braking of the vehicle, controlling acceleration of the vehicle, controlling indicating of the vehicle, controlling lighting of the vehicle, or any combinations thereof.

11. A method, comprising:
receiving data representing a first frame of video content, the video content comprising a plurality of frames;
determining, for at least one object in the first frame, an object type and position in the first frame;
using a policy model, determining a number of frames N of the plurality of frames to skip over based on the type and position of the at least one object in the first frame and the type and position of the at least one objects in one or more prior frames, wherein the policy model has been trained using a reinforced learning method which uses a reward function that rewards, for given states indicative of the type and position of the at least one object, an increase in the number of frames N skipped over, while penalizing the skipping over of determined key frames, wherein the key frames are frames in which new objects appear or object transitions occur; and
providing the N+1 frame of the plurality of frames, and not the skipped-over frames, to a vision model processor configured to analyse the provided N+1 frame.

12. The method of claim 11, further comprising:
controlling a vehicle based on the analysis of the provided N+1 frame.

13. The method of claim 12, wherein the controlling the vehicle further includes at least one of:
controlling steering of the vehicle, controlling braking of the vehicle, controlling acceleration of the vehicle, controlling indicating of the vehicle, controlling lighting of the vehicle, or any combinations thereof.

14. A non-transitory computer readable medium comprising program instructions stored thereon, which when executed by at least one processor causes an apparatus including the at least one processor to:
receive data representing a first frame of video content, the video content comprising a plurality of frames;
determine, for at least one object in the first frame, an object type and position in the first frame;
use a policy model to determine a number of frames N to skip over based on the type and position of the object in the first frame and the type and position of the at least one objects in one or more prior frames, wherein the policy model has been trained using a reinforced learning method which uses a reward function that rewards, for given states indicative of the type and position of the at least one object, an increase in the number of frames N skipped over, while penalizing the skipping over of determined key frames, wherein the key frames are frames in which new objects appear or object transitions occur; and
provide the N+1 frame of the plurality of frames, and not the skipped-over frames, to a vision model processor configured to analyse the provided N+1 frame.

15. An apparatus comprising:
a memory configured to store executable code;
at least one processor configured to execute the executable code and cause the apparatus to perform the operations of,
receiving data representing a plurality of training images representing one or more segments of video;
determining key frames in the plurality of training images, wherein the key frames are frames in which new objects appear or object transitions occur; and
using a reinforced learning method to generate a trained policy model for determining a number N of frames to skip over responsive to a detected state indicative of the respective type and position of at least one object in a frame, the reinforced learning method taking as input the plurality of training images and using a reward function to reward, for given states, an increase in the number of frames skipped over while penalizing the skipping over of the determined key frames to arrive at the trained policy model.

16. A method, comprising:
receiving data representing a plurality of training images representing one or more segments of video;
determining key frames in the plurality of training images, wherein the key frames are frames in which new objects appear or object transitions occur; and
using a reinforced learning method to generate a trained policy model for determining a number N of frames to skip over responsive to a detected state indicative of the respective type and position of at least one object in a frame, the reinforced learning method taking as input the plurality of training images and using a reward function to reward, for given states, an increase in the number of frames skipped over while penalizing the skipping over of the determined key frames to arrive at the trained policy model.

* * * * *

UNITED STATES PATENT AND TRADEMARK OFFICE
CERTIFICATE OF CORRECTION

PATENT NO. : 11,954,880 B2
APPLICATION NO. : 16/857657
DATED : April 9, 2024
INVENTOR(S) : Mathur Akhil It is certified that error appears in the above-identified patent and that said Letters Patent is hereby corrected as shown below:

In the Claims

Column 12, Line number 31, Claim 1 should read:
1. An apparatus, comprising:
    a memory configured to store executable code;
    at least one processor configured to execute the executable code to cause the apparatus to,
    receive data representing a first frame of video content, the video content comprising a plurality of frames;
    determine, for at least one object in the first frame, an object type and position in the first frame;
    using a policy model, determine a number of frames $N$ of the plurality of frames to skip over based on the type and position of the at least one object in the first frame and the type and position of the at least one object in one or more prior frames of the video content, wherein the policy model has been trained using a reinforced learning method which uses a reward function that rewards, for given states indicative of the type and position of the one or more objects in the frame, an increase in the number of frames N skipped over, while penalizing the skipping over of determined key frames, wherein the key frames are frames in which new objects appear or object transitions occur; and
    provide the $N+1$ frame of the plurality of frames, and not the skipped-over frames, to a vision model processor configured to analyse the provided $N+1$ frame.

Column 13, Line number 9, Claim 5 should read:
5. The apparatus of claim 4, wherein
    the reinforced learning method used to train the policy model is configured to take as input a plurality of training images and an object detection model for determining key frames in the plurality of training images.

Signed and Sealed this
Thirteenth Day of May, 2025

Coke Morgan Stewart
*Acting Director of the United States Patent and Trademark Office*

CERTIFICATE OF CORRECTION (continued)
U.S. Pat. No. 11,954,880 B2

Column 13, Line number 36, Claim 11 should read:

11. A method, comprising:

receiving data representing a first frame of video content, the video content comprising a plurality of frames;

determining, for at least one object in the first frame, an object type and position in the first frame;

using a policy model, determining a number of frames $N$ of the plurality of frames to skip over based on the type and position of the at least one object in the first frame and the type and position of the at least one object in one or more prior frames, wherein the policy model has been trained using a reinforced learning method which uses a reward function that rewards, for given states indicative of the type and position of the at least one object, an increase in the number of frames N skipped over, while penalizing the skipping over of determined key frames, wherein the key frames are frames in which new objects appear or object transitions occur; and providing the $N+1$ frame of the plurality of frames, and not the skipped-over frames, to a vision model processor configured to analyse the provided $N+1$ frame.